United States Patent
Xue et al.

(10) Patent No.: US 11,680,075 B2
(45) Date of Patent: *Jun. 20, 2023

(54) APPLICATION OF 4-MEPHNHLI IN CATALYZING HYDROBORATION REACTION OF IMINE AND BORANE

(71) Applicant: SOOCHOW UNIVERSITY, Suzhou (CN)

(72) Inventors: Mingqiang Xue, Suzhou (CN); Xiaojuan Xu, Suzhou (CN); Dandan Yan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 173 days.

This patent is subject to a terminal disclaimer.

(21) Appl. No.: 17/225,568

(22) Filed: Apr. 8, 2021

(65) Prior Publication Data

US 2021/0221829 A1 Jul. 22, 2021

Related U.S. Application Data

(63) Continuation of application No. PCT/CN2018/109377, filed on Oct. 8, 2018.

(51) Int. Cl.
*C07F 5/04* (2006.01)

(52) U.S. Cl.
CPC ....................... *C07F 5/04* (2013.01)

(58) Field of Classification Search
CPC .......................................... C07F 5/04
See application file for complete search history.

(56) References Cited

FOREIGN PATENT DOCUMENTS

| CN | 107930696 A | 4/2018 |
|---|---|---|
| CN | 107971036 A | 5/2018 |
| CN | 108273550 A | 7/2018 |
| CN | 108373480 A | 8/2018 |
| CN | 108554446 A | 9/2018 |

OTHER PUBLICATIONS

Merle Arrowsmith et al., "Magnesium Catalysis of Imine Hydroboration", Chem. Eur. J. 2013, 19, 2776-2783 (Feb. 18, 2013).
Dandan Yan et al., "Highly efficient hydroboration of carbonyl compounds catalyzed by tris(methylcyclopentadienyl) anthanide complexes" Org. Biomol. Chem., 2018, 16, 2787 (Mar. 26, 2018).
James R. Lawson et al., "Tris(2,4,6-trifluorophenyl)borane: An Efficient Hydroboration Catalyst" Chem. Eur. J. 2017, 23, 10997-11000 (Jul. 27, 2017).

*Primary Examiner* — Golam M Shameem
(74) *Attorney, Agent, or Firm* — SZDC Law P.C.

(57) ABSTRACT

The present invention relates to an application of 4-MePhNHLi, in particular, to an application of 4-MePhNHLi in catalyzing hydroboration reaction of imine and borane. A catalyst, borane, and imine are stirred and mixed uniformly in sequence for reaction for 1-2 hours, the reaction is terminated by exposure to air, and the solvent in the reaction liquid is removed under reduced pressure to obtain borate esters having different substituents. According to the present invention, 4-MePhNHLi can catalyze hydroboration reaction of imine and borane at high activity at room temperature, the amount of catalyst is only 4-5 mol % of the molar mass of imine, and the reaction can reach a yield of more than 90%; compared with an existing catalytic system, simple 4-MePhNHLi is used, the reaction conditions are mild, and the yield of borate esters having different substituents can reach 99% in optimized conditions.

6 Claims, No Drawings

APPLICATION OF 4-MEPHNHLI IN CATALYZING HYDROBORATION REACTION OF IMINE AND BORANE

The present application is a Continuation Application of PCT/CN2018/109377, filed on Oct. 8, 2018, which is incorporated by reference for all purposes as if fully set forth herein.

TECHNICAL FIELD

The invention relates to the application of 4-MePhNHLi, in particular to the high-efficiency application of 4-MePhNHLi in the catalytic hydroboration reaction of imine and borane.

BACKGROUND ART

Amine compounds and their derivatives are ubiquitous in nature, especially in the biological world, and have extremely important physiological functions. They are important organic compounds in the fields of biology, chemistry, medicine, etc. Many drugs contain amine functional groups, i.e., amino groups, such as proteins, nucleic acids, antibiotics and alkaloids. Amine compounds have many uses and have a wide range of applications. They are often used to synthesize textiles, dyes, polymers, pigments, and pesticides. Since the hydroboration of the carbonyl group is easy to occur, the development of a highly efficient catalytic system for the hydroboration of unsaturated C=N bonds is of great significance to modern industry and organic synthetic chemistry.

The borohydride reaction of imines has become a research hotspot in recent years. The reported catalysts used in the borohydride reaction of imines mainly include: Mg [Manna, K.; Ji, P.; Greene, F. X.; Lin, W. J. Am. Chem. Soc. 2016, 138, 7488-7491], Ca [Yadav, S.; Pahar, S.; Sen, S. S. Chem. Commun. 2017, 53 (33), 4562-4564], Re [Arevalo, R.; Vogels, C. M.; MacNeil, G. A.; Riera, L.; Perez, J.; Westcott, S. A. Dalton Trans. 2017, 46 (24), 7750-7757], Zn [Mukherjee, D.; Wiegand, A.-K.; Spaniol, T. P.; Okuda, J. Dalton Trans. 2017, 46 (19), 6183-6186]. However, in the currently reported catalytic systems, the catalysts are relatively expensive or difficult to prepare, or the reaction time is long. The reaction needs to be carried out at high temperature, and some catalyst systems have low yields. Therefore, it is important to develop a catalytic system that efficiently catalyzes the hydroboration of imine under mild conditions.

Technical Problem

The object of the invention of the present invention is to provide the application of 4-MePhNHLi i.e., the application of 4-MePhNHLi in the catalytic hydroboration reaction of imine and borane.

Technical Solution

In order to achieve the above object of the invention, the technical scheme adopted by the present invention is: the application of lithium toluidine (lithium p-tolylamine) in the catalytic hydroboration reaction of imine and borane; the chemical formula of lithium toluidine is: 4-MePhNHLi.

The invention also discloses a method of 4-MePhNHLi catalyzed hydroboration reaction of imine and borane, which includes the following steps:

In an anhydrous and oxygen-free environment, under the inert gas atmosphere, loading the imine to a reaction flask, which is treated by dehydration and deoxidation, adding an organic solvent, adding borane, mixing evenly, adding the catalyst 4-MePhNHLi, reacting for 1 h to 2 h, and stirring in air to stop reaction and to obtain the product.

The invention further discloses a method for preparing a boric acid ester, which includes the following steps:

In an anhydrous and oxygen-free environment, under the inert gas atmosphere, loading the imine to a reaction flask, which is treated by dehydration and deoxidation, adding an organic solvent, adding borane, mixing evenly, adding the catalyst 4-MePhNHLi, reacting for 1 h-2 h, and stirring in air to stop reaction and to obtain the product.

In the technical solution above, the imine is an aldimine; the general chemical structural formula of the imine is as follows:

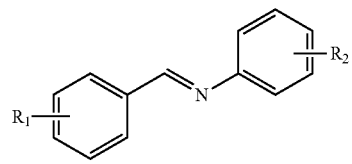

Wherein $R_1$ or $R_2$ is an electron-withdrawing group or an electron-donating group, which can be selected from the group consisting of halogen, methyl, and methoxy; the borane is pinacol borane.

In the technical solution above, an amount of the catalyst can be 4% to 5% of molar amount of imine, and a molar ratio of imine to pinacol borane is 1:1 to 1:1.2.

In the technical solution above, the reaction temperature is room temperature, and the reaction time is between 1 to 2 hours.

In the technical solution above, the organic solvent is tetrahydrofuran.

For the first time the present invention discloses that the commercial reagent 4-MePhNHLi can catalyze the hydroboration reaction of imine under mild reaction conditions, with a high yield and a wide range of substrates. The scope of application, the availability of the catalyst and mild catalytic conditions provide possibilities for industrial applications.

The above technical solution can be expressed as follows:

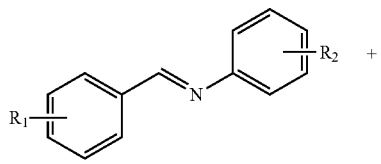

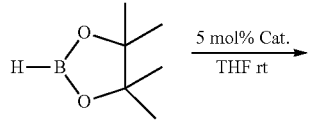

-continued

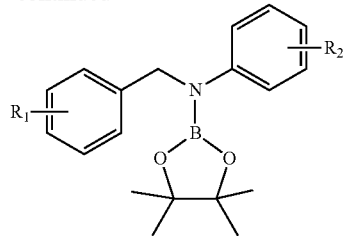

Beneficial Effect

Due to the application of the above technical solutions, the present invention has the following advantages compared with the prior art:
1. The invention discloses for the first time that 4-MePhNHLi can efficiently catalyze the hydroboration reaction between imine and borane, which is highly compatible with the economical synthesis of atoms.
2. The 4-MePhNHLi catalyst disclosed in the present invention has a high catalytic activity for the hydroboration reaction of imine and borane (4% to 5% of the moles of imine used), the reaction time is short (1 h to 2 h), and the reaction conditions are mild (room temperature), high reaction yield, simple and controllable reaction, simple post-treatment, THF as solvent.
3. The catalyst disclosed by the invention has good universality for imines with different substitution positions and different electronic effects.

EMBODIMENTS OF THE INVENTION

The present invention will be further described in combination with the following embodiments:

Example 1 Catalytic Hydroboration Reaction of Biphenylaniline and Pinacol Borane by 4-MePhNHLi In a reaction flask, which was treated by dehydration and deoxidation, 0.5 mmol of biphenylaniline and 100 µl of THF were added under the protection of argon. 0.5 mmol (0.0726 mL) of borane was added with a pipette gun and mixed well. Finally, 34.4 µl of 4-MePhNHLi tetrahydrofuran solution (0.7273 M) (5 mol % amount) was added. The reaction was carried out for 2 hours. A drop of the reaction solution was taken and added to an NMR tube. $CDCl_3$ was then added to the NMR tube. The conversion rate calculated based on $^1H$ is 91%. $^1H$ NMR data of the product is: $^1H$ NMR ($CDCl_3$, 400 MHz) δ: 7.29-7.12 (m, 9H), 6.88-6.84 (t, 1H), 4.69 (s, 2H), 1.29 (s, 12H).

Example 2 Catalytic Hydroboration Reaction of Biphenylaniline and Pinacol Borane by 4-MePhNHLi In a reaction flask, which was treated by dehydration and deoxidation, 0.5 mmol of biphenylaniline and 100 µl of THF were added under the protection of argon. 0.6 mmol (0.0871 mL) of borane was added with a pipette gun and mixed well. Finally, 34.4 µl of 4-MePhNHLi tetrahydrofuran solution (0.7273 M) (5 mol % amount) was added. The reaction was carried out for 1 hour. A drop of the reaction solution was taken and added to an NMR tube. $CDCl_3$ was then added to the NMR tube. The conversion rate calculated based on 41 is 96%. $^1H$ NMR data of the product is: $^1H$ NMR ($CDCl_3$, 400 MHz) δ: 7.29-7.12 (m, 9H), 6.88-6.84 (t, 1H), 4.69 (s, 1H), 1.29 (s, 12H).

Example 3 Catalytic Hydroboration Reaction of Biphenylaniline and Pinacol Borane by 4-MePhNHLi In a reaction flask, which was treated by dehydration and deoxidation, 0.5 mmol of biphenylaniline and 100 µl of THF were added under the protection of argon. 0.6 mmol (0.0871 mL) of borane was added with a pipette gun and mixed well. Finally, 34.4 µl of 4-MePhNHLi tetrahydrofuran solution (0.7273 M) (5 mol % amount) was added. The reaction was carried out for 2 hours. A drop of the reaction solution was taken and added to an NMR tube. $CDCl_3$ was then added to the NMR tube. The conversion rate calculated based on $^1H$ is 99%. $^1H$ NMR data of the product is: $^1H$ NMR ($CDCl_3$, 400 MHz) δ: 7.29-7.12 (m, 9H), 6.88-6.84 (t, 1H), 4.69 (s, 2H), 1.29 (s, 12H).

If 4-methoxyaniline lithium was replaced with the lithium compound of formula I, a hydroboration product could not be obtained.

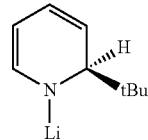

Formula I

Example 4 Catalytic Hydroboration Reaction of Biphenylaniline and Pinacol Borane by 4-MePhNHLi In a reaction flask, which was treated by dehydration and deoxidation, 0.5 mmol of biphenylaniline and 100 µl of THF were added under the protection of argon. 0.6 mmol (0.0871 mL) of borane was added with a pipette gun and mixed well. Finally, 27.5 µl of 4-MePhNHLi tetrahydrofuran solution (0.7273 M) (4 mol % amount) was added. The reaction was carried out for 2 hours. A drop of the reaction solution was taken and added to an NMR tube. $CDCl_3$ was then added to the NMR tube. The conversion rate calculated based on $^1H$ is 97%. $^1H$ NMR data of the product is: $^1H$ NMR ($CDCl_3$, 400 MHz) δ: 7.29-7.12 (m, 9H), 6.88-6.84 (t, 1H), 4.69 (s, 2H), 1.29 (s, 12H).

Example 5 Catalytic Hydroboration Reaction of N-(p-Methylbenzylidene) Aniline and Pinacol Borane by 4-MePhNHLi In a reaction flask, which was treated by dehydration and deoxidation, 0.5 mmol of N-(p-methylbenzylidene) aniline and 100 µl of THF were added under the protection of argon. 0.6 mmol (0.0871 mL) of borane was added with a pipette gun and mixed well. Finally, 34.4 µl of 4-MePhNHLi tetrahydrofuran solution (0.7273 M) (5 mol % amount) was added. The reaction was carried out for 2 hours. A drop of the reaction solution was taken and added to an NMR tube. $CDCl_3$ was then added to the NMR tube. The conversion rate calculated based on $^1H$ is 99%. $^1H$ NMR data of the product is: $^1$H NMR (CDCl$_3$, 400 MHz) δ: 7.23-7.08 (m, 8H), 6.89-6.85 (t, 1H), 4.66 (s, 2H), 2.31 (s, 3H), 1.30 (s, 12H).

Example 6 Catalytic Hydroboration Reaction of N-(p-Methoxybenzylidene) Aniline and Pinacol Borane by 4-MePhNHLi In a reaction flask, which was treated by dehydration and deoxidation, 0.5 mmol of N-(p-methoxybenzylidene) aniline and 100 μl of THF were added under the protection of argon. 0.6 mmol (0.0871 mL) of borane was added with a pipette gun and mixed well. Finally, 34.4 μl of 4-MePhNHLi tetrahydrofuran solution (0.7273 M) (5 mol % amount) was added. The reaction was carried out for 2 hours. A drop of the reaction solution was taken and added to an NMR tube. CDCl$_3$ was then added to the NMR tube. The conversion rate calculated based on $^1$H is 99%. $^1$H NMR data of the product is: $^1$H NMR (CDCl$_3$, 400 MHz) δ: 7.22-7.13 (d, 6H), 6.89-6.80 (d, 3H), 4.63 (s, 2H), 3.77 (s, 3H), 1.30 (s, 12H).

Example 7 Catalytic Hydroboration Reaction of N-(4-Fluorobenzylidene) Aniline and Pinacol Borane by 4-MePhNHLi In a reaction flask, which was treated by dehydration and deoxidation, 0.5 mmol of N-(4-fluorobenzylidene) aniline and 100 μl of THF were added under the protection of argon. 0.6 mmol (0.0871 mL) of borane was added with a pipette gun and mixed well. Finally, 34.4 μl of 4-MePhNHLi tetrahydrofuran solution (0.7273 M) (5 mol % amount) was added. The reaction was carried out for 2 hours. A drop of the reaction solution was taken and added to an NMR tube. CDCl$_3$ was then added to the NMR tube. The conversion rate calculated based on $^1$H is 99%. $^1$H NMR data of the product is: $^1$H NMR (CDCl$_3$, 400 MHz) δ: 7.22-7.15 (d, 6H), 6.98-6.94 (d, 3H), 4.66 (s, 2H), 1.30 (s, 12H).

Example 8 Catalytic Hydroboration Reaction of N-(4-Chlorobenzylidene) Aniline and Pinacol Borane by 4-MePhNHLi In a reaction flask, which was treated by dehydration and deoxidation, 0.5 mmol of N-(4-chlorobenzylidene) aniline and 100 μl of THF were added under the protection of argon. 0.6 mmol (0.0871 mL) of borane was added with a pipette gun and mixed well. Finally, 34.4 μl of 4-MePhNHLi tetrahydrofuran solution (0.7273 M) (5 mol % amount) was added. The reaction was carried out for 2 hours. A drop of the reaction solution was taken and added to an NMR tube. CDCl$_3$ was then added to the NMR tube. The conversion rate calculated based on $^1$H is 99%. $^1$H NMR data of the product is: $^1$H NMR (CDCl$_3$, 400 MHz) δ: 7.20-7.14 (d, 6H), 6.99-6.93 (d, 3H), 4.64 (s, 2H), 1.30 (s, 12H).

Example 9 Catalytic Hydroboration Reaction of N-(4-Bromobenzylidene) Aniline and Pinacol Borane by 4-MePhNHLi In a reaction flask, which was treated by dehydration and deoxidation, 0.5 mmol of N-(4-bromobenzylidene) aniline and 100 μl of THF were added under the protection of argon. 0.6 mmol (0.0871 mL) of borane was added with a pipette gun and mixed well. Finally, 34.4 of 4-MePhNHLi tetrahydrofuran solution (0.7273 M) (5 mol % amount) was added. The reaction was carried out for 2 hours. A drop of the reaction solution was taken and added to an NMR tube. CDCl$_3$ was then added to the NMR tube. The conversion rate calculated based on $^1$H is 99%. $^1$H NMR data of the product is: $^1$H NMR (CDCl$_3$, 400 MHz) δ: 7.24-7.16 (d, 6H), 6.97-6.93 (d, 3H), 4.63 (s, 2H), 1.31 (s, 12H).

Example 10 Catalytic Hydroboration Reaction of Benzylidene-p-Toluidine and Pinacol Borane by 4-MePhNHLi In a reaction flask, which was treated by dehydration and deoxidation, 0.5 mmol of benzylidene-p-toluidine and 100 μl of THF were added under the protection of argon. 0.6 mmol (0.0871 mL) of borane was added with a pipette gun and mixed well. Finally, 34.4 of 4-MePhNHLi tetrahydrofuran solution (0.7273 M) (5 mol % amount) was added. The reaction was carried out for 2 hours. A drop of the reaction solution was taken and added to an NMR tube. CDCl$_3$ was then added to the NMR tube. The conversion rate calculated based on $^1$H is 99%. $^1$H NMR data of the product is: $^1$H NMR (CDCl$_3$, 400 MHz) δ: 7.32-7.28 (d, 5H), 7.10-7.08 (d, 2H), 6.64-6.60 (d, 2H), 4.62 (s, 2H), 1.31 (s, 12H).

Example 11 Catalytic Hydroboration Reaction of N-(Benzylidene)-4-Fluoroaniline and Pinacol Borane by 4-MePhNHLi In a reaction flask, which was treated by dehydration and deoxidation, 0.5 mmol of N-(benzylidene)-4-fluoroaniline and 100 μl of THF were added under the protection of argon. 0.6 mmol (0.0871 mL) of borane was added with a pipette gun and mixed well. Finally, 34.4 of 4-MePhNHLi tetrahydrofuran solution (0.7273 M) (5 mol % amount) was added. The reaction was carried out for 2 hours. A drop of the reaction solution was taken and added to an NMR tube. CDCl$_3$ was then added to the NMR tube. The conversion rate calculated based on $^1$H is 99%. $^1$H NMR data of the product is: $^1$H NMR (CDCl$_3$, 400 MHz) δ: 7.24-7.02 (d, 7H), 6.75-6.70 (d, 2H), 4.66 (s, 2H), 1.32 (s, 12H).

Example 12 Catalytic Hydroboration Reaction of N-(Benzylidene)-4-Chloroaniline and Pinacol Borane by 4-MePhNHLi In a reaction flask, which was treated by dehydration and deoxidation, 0.5 mmol of N-(benzylidene)-4-chloroaniline and 100 μl of THF were added under the protection of argon. 0.6 mmol (0.0871 mL) of borane was added with a pipette gun and mixed well. Finally, 34.4 μl of 4-MePhNHLi tetrahydrofuran solution (0.7273 M) (5 mol % amount) was added. The reaction was carried out for 2 hours. A drop of the reaction solution was taken and added to an NMR tube. CDCl$_3$ was then added to the NMR tube. The conversion rate calculated based on $^1$H is 99%. $^1$H NMR data of the product is: $^1$H NMR (CDCl$_3$, 400 MHz) δ: 7.26-7.05 (d, 7H), 6.74-6.69 (d, 2H), 4.61 (s, 2H), 1.30 (s, 12H).

Example 13 Catalytic Hydroboration Reaction of N-(Benzylidene)-4-Bromoaniline and Pinacol Borane by 4-MePhNHLi In a reaction flask, which was treated by dehydration and deoxidation, 0.5 mmol of N-(benzylidene)-4-bromoaniline and 100 μl of THF were added under the protection of argon. 0.6 mmol (0.0871 mL) of borane was added with a pipette gun and mixed well. Finally, 34.4 μl of 4-MePhNHLi tetrahydrofuran solution (0.7273 M) (5 mol % amount) was added. The reaction was carried out for 2 hours. A drop of the reaction solution was taken and added to an NMR tube. CDCl₃ was then added to the NMR tube. The conversion rate calculated based on ¹H is 99%. ¹H NMR data of the product is: ¹H NMR (CDCl₃, 400 MHz) δ: 7.27-7.03 (d, 7H), 6.76-6.71 (d, 2H), 4.62 (s, 2H), 1.30 (s, 12H).

The invention claimed is:

1. A method of preparing a borate ester comprising:
reacting an imine with a borane in an organic solvent and in the presence of 4-MePhNHLi as a catalyst at room temperature under anhydrous, oxygen-free, and inert gas conditions for 1-2 hours; and
stirring in air to stop reaction and to obtain the borate ester.

2. The method of claim 1, wherein:
the imine has the following structure:

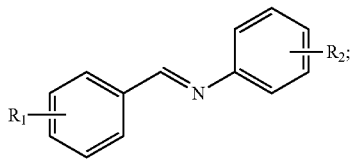

the borane is pinacol borane;
the borate ester has the following structure:

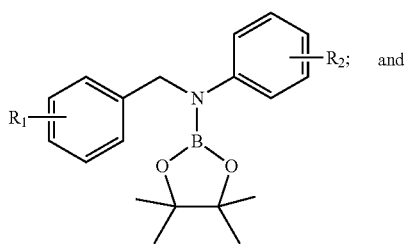

$R_1$ and $R_2$ are independently selected from the group consisting of halogen, methyl and methoxy.

3. The method of claim 1, wherein the organic solvent is tetrahydrofuran.

4. The method of claim 1, wherein an amount of 4-MePhNHLi is 4% to 5% of a molar amount of the imine.

5. The method of claim 1, wherein a molar ratio of the imine to the borane is 1:1 to 1:1.2.

6. The method of claim 5, wherein the molar ratio of the imine to the borane is 1:1.2.

* * * * *